UNITED STATES PATENT OFFICE.

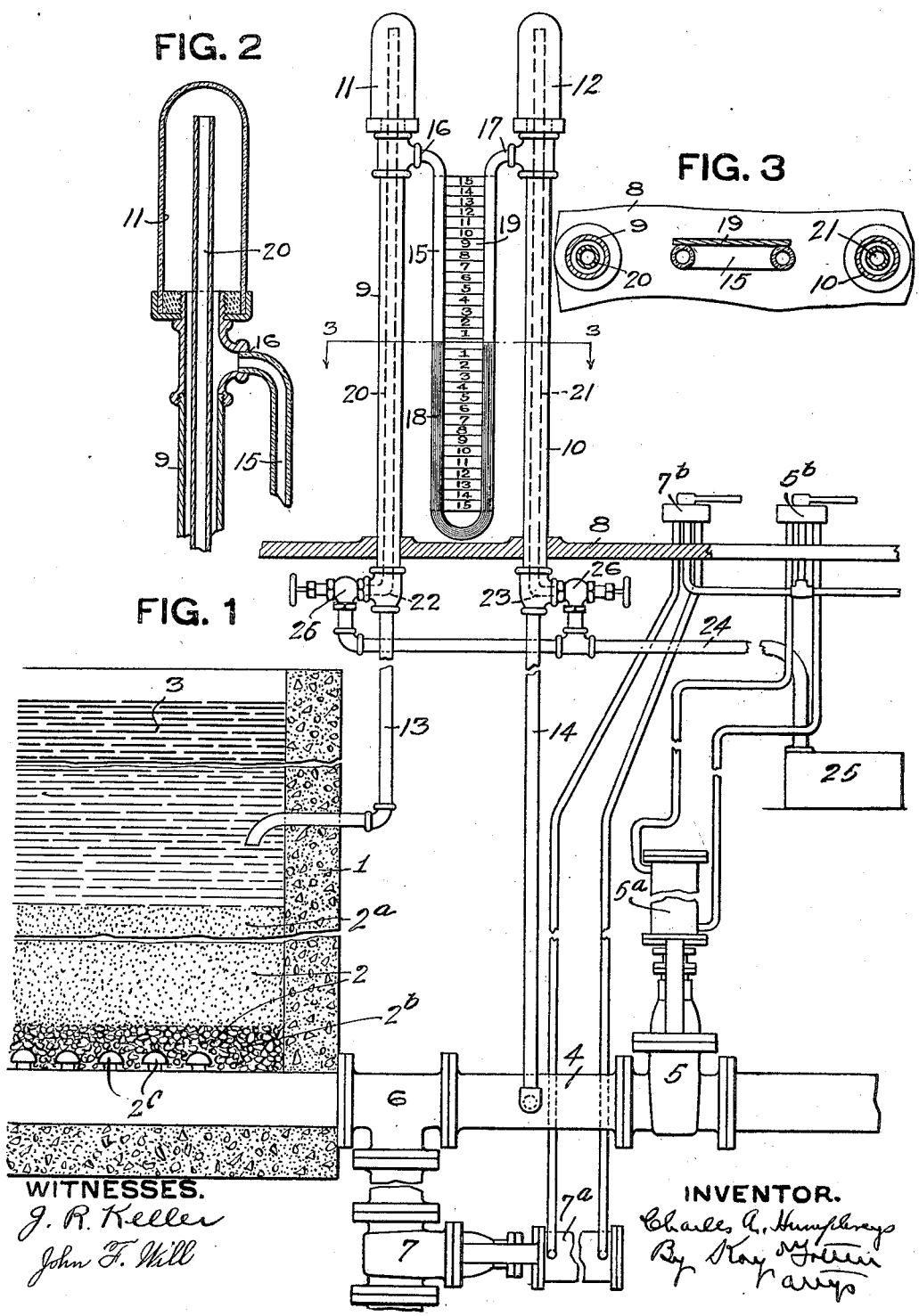

CHARLES A. HUMPHREYS, OF CARRICK, PENNSYLVANIA.

LOSS-OF-HEAD GAGES.

1,101,502.

Specification of Letters Patent. Patented June 23, 1914.

Application filed February 7, 1912. Serial No. 676,158.

*To all whom it may concern:*

Be it known that I, CHARLES A. HUMPHREYS, a citizen of the United States, and resident of Carrick, in the county of Allegheny and State of Pennsylvania, have invented a new and useful Improvement in Loss-of-Head Gages; and I do hereby declare the following to be a full, clear, and exact description thereof.

My invention relates to gages and is particularly concerned with a gage adapted to be used with filters to indicate the frictional loss or "loss of head" due to the passage of the water through the sand bed or other filtering medium, sustaining medium, the strainer system, and the gradual clogging of the bed by the impurities in filtration.

The object of the invention is to provide a gaging device which shall be sensitive and absolutely accurate in its indications, which may be located at any point within a range of 27 feet above the level of the liquid in the filter bed, so that the gage may be conveniently located above and free of the filtering apparatus for ease of observation, such as on an operating table or stand.

A further object is to so construct and arrange the gage relative to the filter receptacle and outlet that the same gage may be employed to indicate the pressure or head of the wash water introduced into the filter to loosen and dispose of the foul sediment on the "skin" through the filtering medium.

With these objects in view the invention consists in a construction and arrangement of parts the preferred embodiment of which is illustrated in the accompanying drawing, in which—

Figure 1 is a view of the indicating or gaging apparatus in elevation applied to a filter and its outlet, the filter receptacle being shown in vertical section; Fig. 2 is a sectional view in the plane of the drawing of the upper end of the gage standards; and Fig. 3 is a sectional view on the line 3—3 Fig. 1.

In this, the preferred embodiment of my invention, 1 indicates a filter receptacle bedded with a filter medium 2, through which the liquid 3 percolates such as a bed of sand $2^a$ supported upon a bed of gravel $2^b$ above the strainer system $2^c$ communicating with the outlet pipe 4 in the usual manner. The outlet pipe is provided with a valve 5 by which the outward flow may be governed at will. The outlet pipe is further provided with a T 6 forming a wash water branch connection in which is located a controlling valve 7. The valves 5 and 7 can be operated by any suitable means, such as by water under pressure operating upon the water cylinders $5^a$ and $7^a$ connected to stand valves which are of the gate type. These cylinders can be operated by valves $5^b$ and $7^b$ on the operating table 8, or by extended stems and hand wheels. The gage proper comprises a suitable support or table 8 upon or within which are mounted gage standards or riser tubes 9 and 10, respectively, preferably terminating at their upper ends in glass chambers 11 and 12. One of these risers is connected by a pipe 13 with the filter 1; the other by a pipe 14 with the filter outlet pipe 4. Located preferably between these risers is a U shaped gage tube 15 having a branch communicating at 16 with the riser 9, and a second branch communicating at 17 with the riser 10. The gage tube contains any suitable kind of gage fluid indicated at 18, which may be mercury or other liquid of relatively high specific gravity which will not mix with the water or other liquid to be filtered. Between the branches of the gage tube is a scale 19 which is properly graduated for the required indications. Preferably extending within the riser tubes 9 and 10 are what may be termed vacuum pipes 20 and 21, respectively, said pipes extending up within a short distance of the tops of the chambers 11 and 12, respectively. The lower ends of these tubes emerge at 22 and 23 and are connected with a pipe 24 leading to any suitable form of vacuum producing apparatus such as the pump 25. Controlling valves 26 are introduced in the connection of the pipes 20 and 21 to fit the pipe 24.

The operation of the apparatus thus far described is as follows: When the liquid to be filtered is turned into the filter receptacle 1 and stands above the opening of the riser pipe 13, and after the filter has been operating for sufficient time to fill the outlet pipe 4, valves 26 are opened, thereby enabling the vacuum apparatus to exhaust all air in the riser tubes, the chambers 11 and 12 and in the branches of the gage tube 15 above the liquid 18. Thereupon liquid from the upper side of the filter rises in the pipe 13 and overflows into the adjacent branch of the gage tube and finally overflows into the vacuum tube 20 until all air is expelled from this branch of the gage. Likewise the liquid rises and fills the riser 10, the chamber 12, adjacent branch of the gage tube and the vacuum tube 21. Upon closing tightly the valves 26 the gage will be thrown into operation and when the filter outlet valve 5 is closed the pressure being the same the gage liquid in the two branches will stand at the same height but as soon as the outlet pipe is opened the friction in the bed and strainer system will cause difference in pressure between the upper side of the filter and the filter outlet pipe 4 according to the rate of flow through the filter bed. Any deviation from this indication will show at once the condition of the filter bed or filtering medium and of the deposit on the surface of said medium. That is to say, the gage will instantly show whether, on the one hand, the filtering medium has become so fouled or clogged or the sediment layer thereon has become so thick that the filter is not passing the desired amount of water, or, on the other hand, it will indicate whether the sediment layer on the filtering medium has "broken down", permitting a too free flow of the water through the filtering medium.

Another aspect of my invention relates to the use of this gage to indicate the pressure or head of the wash water employed to renovate the filtering medium. This "washing" of the filter is usually effected by a reverse current of filtered liquid through the outlet pipe and strainer system whereby the said liquid is forced under pressure up through the filtering material, and washes the accumulated dirt or sediment from the body of sand, loosening up the bed and floating the dirt over the over-flow pans or lips of the filtering receptacle. It is essential to the successful operation of this washing process and to the preservation of the filter bed that the pressure of the wash liquid be not so great as to throw the filtering medium into suspension in the water to the extent that the same may be carried off with the overflow or waste. With the apparatus of my invention the outlet valve 5 may be closed and the inlet valve 7 for the wash liquid opened to admit the wash liquid to the filter bed. At the same time the pressure of this wash liquid will be communicated through the riser tube 14 of the gage and the fact of this pressure will be immediately indicated by the rather violent change of levels of the opposite branches of the gage liquid. The gage scale is graduated to indicate the degrees of this pressure and when the gage reaches approximately a danger point the pressure of the wash water may be modified by manipulating the valve 7, as through the water cylinder 7ª.

By my invention the action of the filter including the friction throughout the sand bed and the gradual clogging of said bed by the separation of said impurities from the liquid can be accurately indicated upon the operating table any distance above the filter itself not exceeding the height of a water column due to atmospheric pressure, and when the gage indicates such high friction that the bed requires washing, upon the proper operation of the valves this may be accomplished by reversing the current of liquid through the filter bed. The gage indicates the condition during the operation of washing and the operator can watch the gage so as to control the flow of wash liquid and prevent the overflowing of the sand itself into the troughs during the washing operation. While the apparatus as illustrated embodies the preferred form of the invention, it is to be understood that the same may be varied in details and arrangements of parts within the appended claims.

What I claim is:

1. The combination with a filter bed and its outlet, of a gage having a riser tube communicating with the upper side of the filter bed, a riser tube communicating with the outlet of the filter, a gage containing a gaging fluid having branches communicating with each of said riser tubes respectively, means for producing a vacuum in said riser tubes and said gage tube whereby the liquid from the upper side of said filter and from the outlet of said filter will be drawn up into said riser tubes respectively, and into the adjacent branches of the gage tubes, and means to close said vacuum producing connections.

2. In a device of the character described, the combination with a filter receptacle having a filtering medium therein and an outlet, of a gage located above the level of the liquid in said receptacle at a height not exceeding that of a water column due to atmospheric pressure and comprising a riser tube communicating with said receptacle, a second riser tube communicating with said outlet, a gage connected with said riser tubes respectively, means for producing a vacuum in said riser tubes whereby columns of liquid may be drawn up said riser tubes and into communication with the opposite sides of said gage, and means to close off said vacuum connections.

3. In a device of the character described, the combination with a filter receptacle having a filtering medium therein and an outlet, of a gage located above the level of the liquid in said receptacle and comprising a riser tube extending into said receptacle below the normal level of the liquid therein, a second riser tube communicating with said outlet, a U-shaped gage tube having a branch communicating with each of said riser tubes respectively, near their upper ends, and vacuum producing apparatus having connections with said riser tubes respectively above their connections with the gage tube.

4. In a device of the character described, the combination with a filter receptacle having a filtering medium and an outlet, of a valve to close said outlet, a gage located anywhere except that it may not be at a height exceeding that of a water column due to atmospheric pressure above the highest liquid to be gaged or indicated, and having a riser tube extending into said receptacle above the filter bed and below the normal level of the liquid and having a second riser tube communicating with said outlet between said receptacle and said controlling valve, a gage tube having opposite branches communicating with the upper ends of said riser tubes respectively and containing a gaging liquid, means for producing a vacuum within said riser tubes and the adjacent branches of the gage tube to draw liquid from said receptacle and said outlet into communication with the opposite portions of the gage liquid, a wash water inlet communicating with said outlet between said receptacle and said outlet valve, and a controlling valve in said wash water inlet.

5. In a device of the character described, the combination with a filter receptacle having a filter bed and an outlet, of a gage containing a gaging liquid, located above the level of the liquid in said receptacle and having a branch communicating with said receptacle below the normal level of the liquid therein and having a second branch communicating with the outlet and means for causing the pressures in said receptacle and in said outlet to be communicated to opposite portions of said liquid, means for closing said outlet and means for turning a current of wash water into said outlet and upwardly through the filtering medium, said gage tube communicating with said outlet being so arranged as to communicate the pressure of said wash water to said gage.

6. The combination with a liquid container in which a portion of the liquid is in substantially a condition of rest and another portion is in a condition of movement, of a gage having a riser tube communicating with the static portion of the liquid, a riser tube communicating with the moving portion of the liquid, a gage containing a gaging fluid and having branches communicating with each of said riser tubes respectively, means for producing a vacuum in said riser tubes and said gage tube whereby a portion of the static and said moving liquid will be drawn up into said riser tubes respectively, and into the adjacent branches of the gage tube and means to close said vacuum producing connection.

7. The combination with a liquid container in which a portion of the liquid is in substantially static condition and another portion is in a moving condition, means in said container opposing the flow of liquid from the first to the second portions, a riser tube communicating with the moving portion of the liquid, a gage containing a gaging fluid and having branches communicating with each of said riser tubes respectively, means for producing a vacuum in said riser tubes and said gage tube, whereby portions of the static and said moving liquid will be drawn up into said riser tubes, respectively, and into the adjacent branches of the gage tubes, and means to close said vacuum producing connection.

8. In a device of the character described, the combination with a liquid container in which a portion of the liquid is in substantially static condition and another portion in a moving condition, and means opposing the movement of liquid from said static portion to said moving portion, and vice versa, of a gage located above said container at a height not exceeding that of a water column due to atmospheric pressure above the level of the liquid in said container and comprising a riser tube communicating with the static portion of said liquid, a second riser tube communicating with the moving portion of said liquid, a gage connected with said riser tubes, respectively, means for producing a vacuum in said riser tubes, whereby columns of liquid may be drawn up said riser tubes into communication with the opposite sides of said gage and means to close off said vacuum connection.

9. In a device of the character described, the combination with a liquid container in which a portion of the liquid is in substantially static condition and another portion is in a moving condition, a medium interposed between said portions of liquid adapted to oppose the flow of liquid from one portion to the other of a gage located above the level of the static portion of said liquid and comprising a riser tube, extending into said static portion of the liquid below the level thereof, a second riser tube communicating with the moving portion of said liquid, a U-shaped gage having a branch communicating with each of said tubes respectively near their upper ends and vacuum producing apparatus having connections with said riser tubes, respectively, above their connections with the gage tubes.

10. In a device of the character described, the combination with a liquid container, in which a portion of the liquid is in substantially static condition, and another portion is in a moving condition, means interposed between said portions to oppose flow from one to the other, of a valve communicating with a portion of the container containing the moving liquid, a gage located anywhere except that it may not be at a height exceeding that of a water column due to atmospheric pressure above the highest portion of the liquid to be gaged or indicated, and having a riser tube extending into said static portion of the liquid and having a second riser tube communicating with the moving portion of the liquid between said portion and said valve, a gage tube having opposite branches communicating with the upper ends of said riser tubes, respectively, and containing the gaging liquid, means for producing a vacuum within said riser tubes, and the adjacent branches of the gage tube to draw liquid from said static and said moving portions of said liquid into communication with the opposite portions of the gaging liquid respectively, means for causing a flow of liquid between said static and moving portion in either direction, said gage being adapted to indicate the direction of flow and the force of flow in either case.

11. In a device of the character described, the combination with a liquid container in which a portion of the liquid is in substantially static condition and another portion is in a moving condition, of a gage containing a gaging liquid located above the highest point of liquid in said container, and having a branch communicating with the static portion of said liquid and having a second branch communicating with the moving portion of said liquid, and means for causing the pressures in both portions of said liquid to be communicated to opposite portions of said gaging liquid, means for checking the motion of said moving portion of the liquid, and means for reversing the movement therein, said gage tube communicating with said moving portion being so arranged as to cause indication in said gage of the direction and force of movement of said moving portion of the liquid in either direction.

In testimony whereof I the said CHARLES A. HUMPHREYS have hereunto set my hand.

CHARLES A. HUMPHREYS.

Witnesses:
  ROBERT C. TOTTEN,
  JOHN F. WILL.

---

Copies of this patent may be obtained for five cents each, by addressing the "Commissioner of Patents, Washington, D. C."